Figure 1:
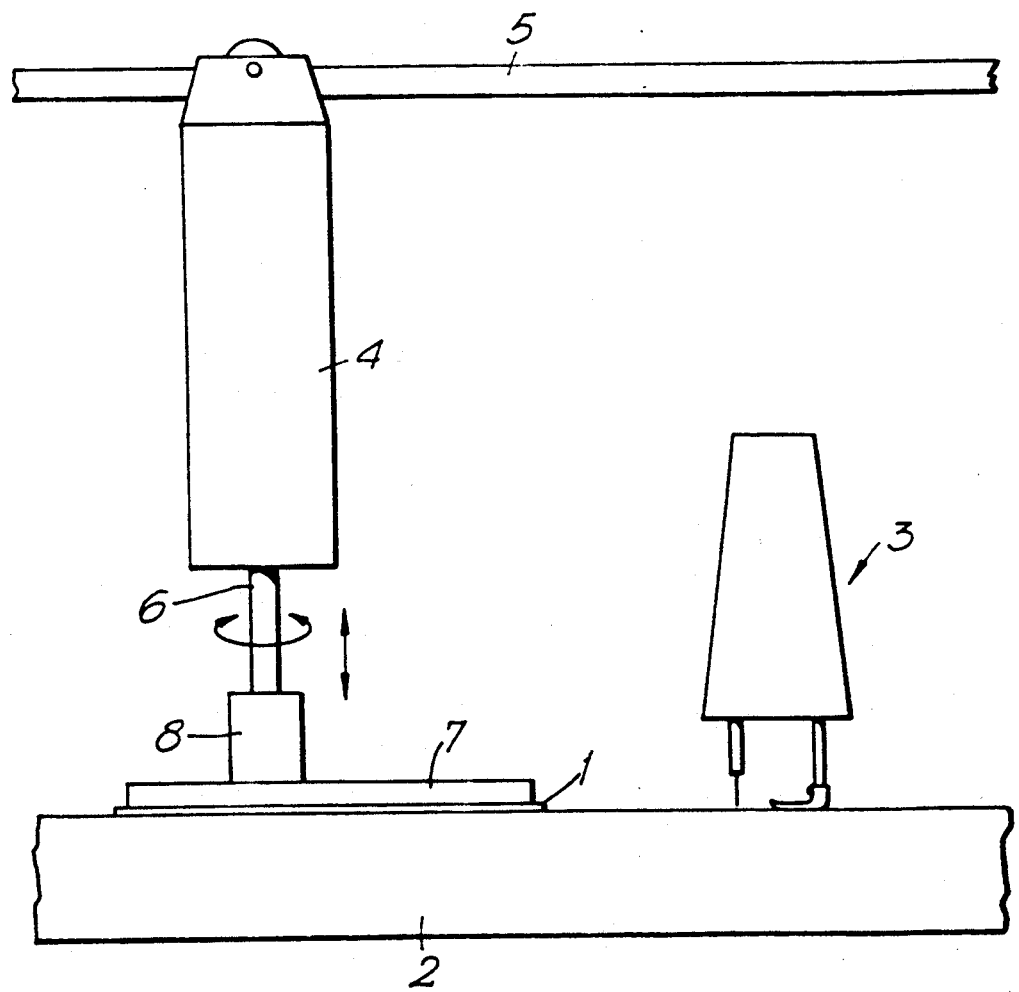

United States Patent [19]

Morris et al.

[11] Patent Number: 5,238,237
[45] Date of Patent: Aug. 24, 1993

[54] SHEET HANDLING APPARATUS

[75] Inventors: Paul R. Morris, Broughton Astley; David C. Munday, Rusheymead; Keith Jeffcoat, Nuneaton, all of England

[73] Assignees: Cegelec Projects Limited; Courtaulds, p.l.c., both of United Kingdom

[21] Appl. No.: 985,222

[22] Filed: Dec. 2, 1992

Related U.S. Application Data

[63] Continuation of Ser. No. 671,808, Apr. 26, 1991, abandoned.

[30] Foreign Application Priority Data

Oct. 4, 1988 [GB] United Kingdom ............... 8823213

[51] Int. Cl.$^5$ ............................................. B65H 29/46
[52] U.S. Cl. ................................ 271/84; 271/267; 414/751; 112/303
[58] Field of Search ................. 271/267, 268, 273, 84; 414/749, 751; 901/28, 29; 198/740, 468.01; 112/303, 311, 314, 319, 320, 324, 121.15, 121.29

[56] References Cited

U.S. PATENT DOCUMENTS 3,383,107  5/1968  Hedegaard .................. 271/84 X
4,102,284  7/1978  Rohr .......................... 271/84 X

FOREIGN PATENT DOCUMENTS 0036912  10/1981  European Pat. Off. .
0163065  12/1985  European Pat. Off. .
0191246   8/1986  European Pat. Off. .
0307550   3/1989  European Pat. Off. .
2143798   2/1985  United Kingdom .

Primary Examiner—David H. Bollinger
Attorney, Agent, or Firm—Kirschstein et al.

[57] ABSTRACT

In order to move a piece of fabric (1) over a work table (2) using a gantry robot (4), a gripper (7) comprising a flat foam-covered plate is lowered on to the fabric by the robot shaft (6). It is found that the best control over the fabric is obtained by allowing the gripper to rest on the fabric solely under its own weight, i.e. it should not be pressed down by the robot shaft. A flexible coupling (8) allows the gripper to float, while preventing relative rotation between the robot shaft and the gripper. The coupling is mounted to be movable up and down relative to the shaft, and a coupling part (13) to which the gripper is attached can tilt along two horizontal axes. When the gripper is raised, compressed air is introduced into the coupling, causing parts (11,15) of the two coupling members (10,13) to make contact, so that the gripper is held rigidly in a horizontal position. It is held in that attitude while it is lowered on to the fabric, and the pressure is then released.

8 Claims, 2 Drawing Sheets

SHEET HANDLING APPARATUS

This application is a continuation of application Ser. No. 671,808, filed Apr. 26, 1991, now abandoned.

This invention relates to apparatus for handling flexible sheets, and particularly to apparatus for moving pieces of fabric over a work area, such as in a garment manufacturing system.

Garments, such as underclothes and blouses, have previously been made by passing suitably-shaped pieces of fabric ("cut parts") to a machinist, who then overlays and/or folds them as required, and passes them through a sewing machine. The machinist binds the edges and adds lace and elasticated waistbands, where necessary. The accuracy of that process relies on the machinist's skill, and nominally-identical garments can finish up with quite large differences in sizes and shapes.

Systems have been proposed for automating at least a part of the manufacturing process by using a robot to move a cut part to a work station, such as a sewing machine. The movement of the cut part is effected by a "gripper" which is mounted on the output shaft of the robot. In the known systems the gripper has engaged with the cut part by virtue of suction applied to the gripper, which causes the cut part to adhere to the gripper, or by virtue of downward pressure applied to the gripper by the robot so that horizontal movement of the gripper by the robot then causes the cut part to slide over a smooth work table on which it is positioned.

It is an object of the present invention to provide an improved arrangement for effecting engagement between a gripper and a flexible sheet.

According to the invention there is provided a coupling device for coupling a gripper to an output shaft of a robot in a sheet handling system in which in use the lower surface of the gripper engages with the upper surface of a flexible sheet, whereby movement of the gripper by the robot shaft causes the sheet to slide over a surface therebelow, the coupling device comprising means to allow the gripper to bear against the sheet solely by virtue of the dead weight of the gripper, while substantially preventing relative rotation between the shaft and the gripper.

Figure 2:
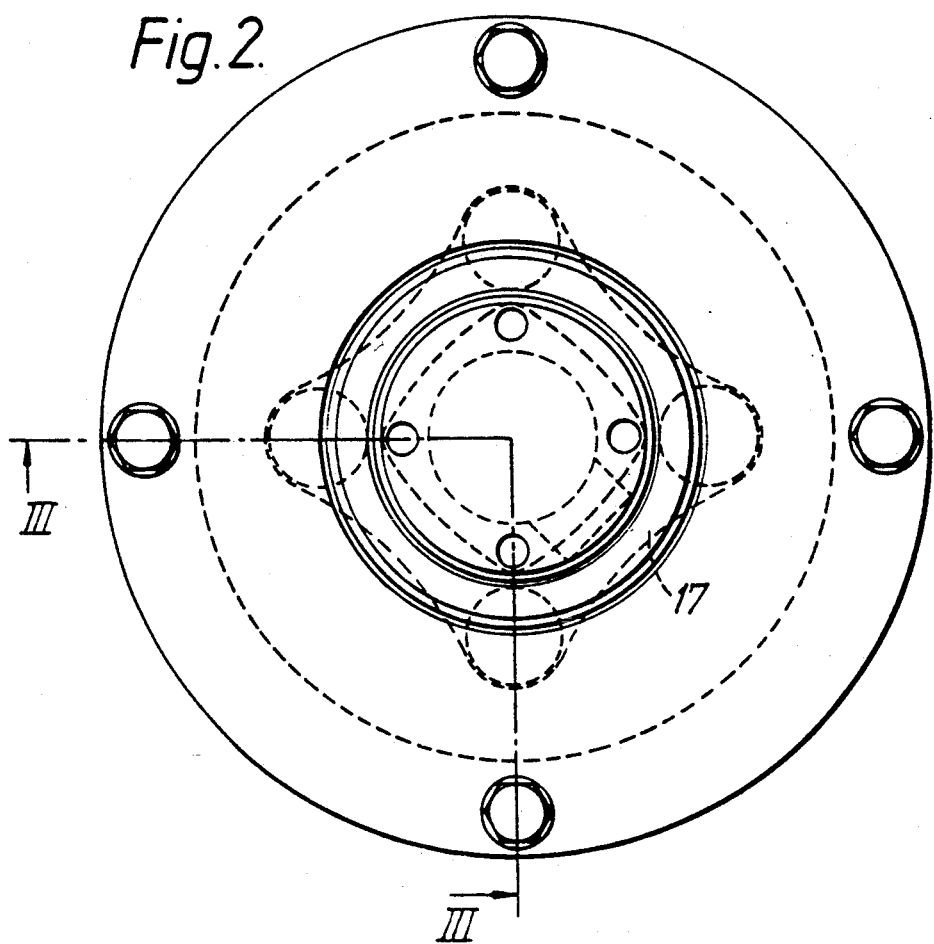
Figure 3:
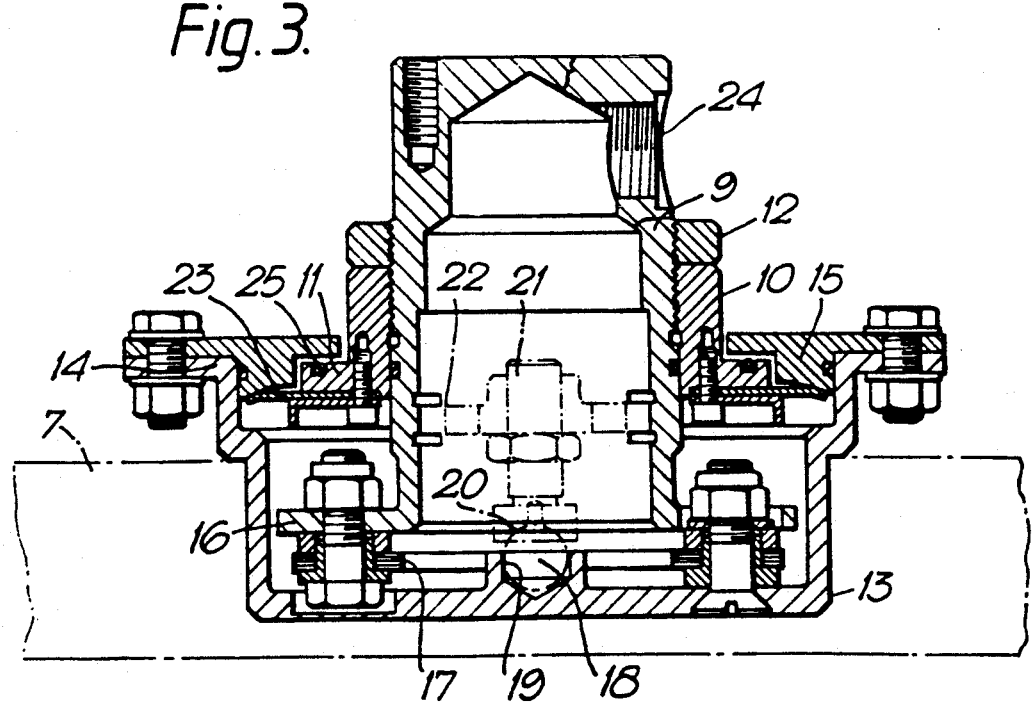

An embodiment of the invention will now be described, by way of example, with reference to the accompanying drawings, in which FIG. 1 is a schematic side view of a part of a garment manufacturing system incorporating a coupling device in accordance with the invention, FIG. 2 is a plan view of a flexible coupling forming part of the device of FIG. 1, and FIG. 3 shows a cross section taken along a line III—III of FIG. 2.

Referring to FIG. 1, a cut part 1 is to be moved over a flat smooth table 2 to a sewing station 3 by a robot 4. The robot is supported by an overhead gantry 5 for movement longitudinally and transversely of the table. The robot has a substantially vertical output shaft 6 which can rotate about its axis and can move longitudinally upwards and downwards. A gripper 7 is attached to the shaft 6 by means of a flexible coupling 8.

We have found that the best gripper structure appears to comprise a foam pad mounted on a rigid support plate of whatever shape is required for the particular operation (e.g. it might be circular, rectangular, U-shaped for getting under the body of the sewing machine, etc.). The gripper may be quite small for holding a cut part of lace or it may be up to, say, 1 meter long and ½ meter wide for holding cut parts for some types of garment. The optimum arrangement would give an even distribution of downward force on the cut part over the whole of the area of the gripper.

However, various problems arise. If the robot 4 is made to bear down on the gripper 7 at its attachment point, which may not be anywhere near the centre of area of the gripper, the foam will be compressed against the cut part under the connection point, but may become completely separated from the cut part at more remote points and so provide no control. It would be possible to control the pressure exerted by the robot along a number of axes to prevent tipping of the gripper, but this would require a complicated arrangement of sensors and force controllers.

We have found that, in order to obtain the desired substantially even force distribution in a simple manner, the gripper should not be pressed down by the robot but, in accordance with the present invention, should be allowed to act downwards on the cut part solely under its own weight. One possible arrangement would be to allow the gripper to float on a ball joint on the end of the robot shaft. However, this is not the best arrangement, as it has some drawbacks. Firstly, due to friction between the gripper and the cut part and/or the table, the leading edge of the gripper may tend to "dig-in" during movement of the cut part, so that the gripper tips up, leaving the cut part uncontrolled. Secondly, when the gripper is raised from the table, unless it is absolutely balanced (which it very probably will not be) it will tip. Then, when it is lowered on to a cut part, the edge of the heavier end of the gripper will contact the cut part first and, while the gripper is flattening out, the cut part will be moved away from its starting position, which may already have been accurately sensed.

In a preferred embodiment of the invention the coupling 8 is so constructed as to alleviate the above-mentioned drawbacks. The coupling is shown in plan in FIG. 2 and in section in FIG. 3. It should be noted that the two halves of the sectional view are mutually rotated by 90°. It comprises an upper hollow cylindrical member 9 which is attached to the robot shaft 6 by a ball spline device (not shown), so that the member 9 can move up and down relative to the robot shaft but cannot twist relative thereto (as the robot is required to rotate the gripper accurately in order to achieve the necessary orientation of the cut part, there must be substantially no relative rotation between the robot shaft and the gripper). An outer collar 10 having an outwardly-pointing flange 11 is screwed on the outside of the member 9, and is locked by a nut 12. A lower hollow cylindrical cap member 13 has an outwardly-extending flange 14 to which a cover plate 15 is bolted. The cover plate 15 overlaps the flange 11 when the components are assembled. The member 9 has an outwardly-pointing flange 16 to which a generally square multi-layer flexible coupling 17 is attached at two opposite corners. The other corners of the coupling are attached to the member 13. Hence, the members 9 and 13 can tilt relative to each other along two orthogonal lines, but substantially no rotation between them is allowed by the coupling 17.

To provide further control over the alignment of the axes of the members 9 and 13, a ball 18 is seated in a recess 19 in the base of the member 13 and in a recess 20 in the end of an axial, externally threaded member 21. The distance of the member 21 from the member 13 is adjustable by means of a screwed connection to a perforated circular support 22 which is attached to the inner surface of the cylindrical wall of the member 9. A resilient diaphragm 23 seals against the cover plate 15 so that a sealed chamber is formed within the members 9 and 13, the collar 10 and the plate 15. An inlet 24 for receiving compressed air is provided near the top of the member 9. The gripper 7 is rigidly attached to the member 13 so that the centre of the ball 18 is approximately half-way down the depth of the gripper.

In use of the device, the mass of the ball spline and the coupling is approximately balanced by tension springs (not shown) coupled between the ball spline and to the robot shaft, so that the effective mass acting on the cut part is substantially only that of the gripper itself. When the robot shaft is raised to separate the gripper from the cut part, compressed air is introduced into the chamber through the inlet 24, and the member 13 moves downward under the air pressure, so that the cover plate 15 bears firmly against the flange 11. This causes contact to be made between the cover plate and an 0-ring 25, which effects further sealing of the chamber. This now rigid connection between the members 9 and 13 holds the gripper horizontal, irrespective of its degree of unbalance. The pressure is maintained until after the gripper has been subsequently lowered on to the cut part, and then it is released. The gripper can now adopt its required attitude on the cut part, and the downward force is dependent only on the dead weight of the gripper. The flexible coupling 17 now allows slight tilting of the gripper, but has sufficient rigidity to prevent the excessive tilting due to friction mentioned above and, since the robot does not press down on the gripper, the above-mentioned tilting due to offsetting of the robot shaft connection position does not occur.

We claim:

1. Sheet handling apparatus, comprising: a robot having a substantially vertical rotatable robot shaft; a coupling device mounted on said robot shaft; and a gripper carried by the coupling device and movable by the robot, said gripper having a lower surface for engaging with a surface of a flexible sheet so that movement of the gripper by the robot causes the sheet to slide over a surface thereunder; said coupling device including a first part coupled to the robot shaft, and a second part coupling the gripper to said first part, said first part being slidable axially of the robot shaft to allow the gripper to move upwards and downwards relative to the robot shaft and thereby to bear against the sheet solely by virtue of the dead weight of the gripper.

2. Apparatus as claimed in claim 1, wherein said second part comprises a first hollow member, and a second hollow member, concentric with said first hollow member and resiliently connected to said first hollow member to allow relative tilting between said first and second hollow members, said hollow members forming a chamber therebetween; and means for introducing fluid under pressure into said chamber to cause relative movement between said hollow members bringing the hollow members into non-resilient contact rendering the resilient connection ineffective.

3. Apparatus as claimed in claim 2, wherein the hollow members are resiliently interconnected by a resilient structure having two pairs of opposite corners, the first hollow member being fixed to the resilient structure at one of said pairs of corners, and the second hollow member being fixed to the resilient structure at the other of said pairs of corners.

4. Apparatus as claimed in claim 3, wherein the resilient structure comprises a stack of resilient plates.

5. Apparatus as claimed in claim 2, wherein the first member includes an inwardly-directed flange portion, and the second member includes a diaphragm which engages with the flange portion to form a seal between the members.

6. Apparatus as claimed in claim 5 comprising further sealing means for sealing between the members which becomes effective when the members are moved relative to each other by the fluid pressure.

7. Apparatus as claimed in claim 2, wherein said first member has a first recess therein and said second member has a second recess therein facing said first recess; and wherein a ball is seated in said recesses and is operative to centralize the members at a level within the thickness of the gripper.

8. Garment manufacturing apparatus including sheet handling apparatus as claimed in claim 1.

* * * * *